US008717920B2

United States Patent
Larsson et al.

(10) Patent No.: US 8,717,920 B2
(45) Date of Patent: May 6, 2014

(54) SIGNALLING MECHANISM FOR MULTI-TIERED INTRA-BAND CARRIER AGGREGATION

(75) Inventors: Magnus Larsson, Sollentuna (SE); Robert Baldemair, Solna (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 281 days.

(21) Appl. No.: 13/216,850

(22) Filed: Aug. 24, 2011

(65) Prior Publication Data

US 2012/0087257 A1 Apr. 12, 2012

Related U.S. Application Data

(60) Provisional application No. 61/391,209, filed on Oct. 8, 2010.

(51) Int. Cl.
*H04W 72/00* (2009.01)

(52) U.S. Cl.
USPC ............ 370/252; 370/328; 370/330; 370/329

(58) Field of Classification Search
USPC .......... 370/328–330, 336, 252; 455/450, 436, 455/422.1
See application file for complete search history.

(56) References Cited

U.S. PATENT DOCUMENTS

| | | | | |
|---|---|---|---|---|
| 2009/0122731 A1* | 5/2009 | Montojo et al. | ............... | 370/280 |
| 2009/0238091 A1* | 9/2009 | Kim et al. | ..................... | 370/252 |
| 2010/0150069 A1* | 6/2010 | Fang et al. | .................... | 370/328 |
| 2010/0150092 A1* | 6/2010 | Aydin et al. | .................... | 370/329 |
| 2010/0265968 A1* | 10/2010 | Baldemair et al. | ............ | 370/503 |
| 2011/0034175 A1* | 2/2011 | Fong et al. | ..................... | 455/450 |
| 2011/0051681 A1* | 3/2011 | Ahn et al. | ....................... | 370/330 |
| 2011/0268032 A1* | 11/2011 | Kim et al. | ...................... | 370/328 |
| 2011/0275359 A1* | 11/2011 | Sebire et al. | ............... | 455/422.1 |
| 2012/0250606 A1* | 10/2012 | Gao et al. | ....................... | 370/315 |

OTHER PUBLICATIONS

International Search Report and Written Opinion of the International Searching Authority, PCT Application No. PCT/IB2011/054298, Feb. 8, 2012.
Mikio Iwamura et al.; "Carrier aggregation framework in 3GPP LTE-advanced [WiMAX/LTE Update]", IEEE Communications Magazine, IEEE Service Center, ISSN: 0163-6804, Aug. 1, 2010, pp. 60-67, vol. 48, No. 8, Piscataway, US; XP011315996.
3GPP™, "3$^{rd}$ Generation Partnership Project; Technical Specification Group Radio Access Network; Further Advancements for E-UTRA Physical Layer Aspects"; Release 9; 3GPP TR 36.814 V1.3.0; (Jun. 2009), 46 pp.; XP050388254.

(Continued)

*Primary Examiner* — Dang Ton
*Assistant Examiner* — Sai Aung
(74) *Attorney, Agent, or Firm* — Myers Bigel Sibley & Sajovec, P.A.

(57) ABSTRACT

Methods of performing intra-band carrier aggregation in a multi-tiered wireless network include determining a capability of a user equipment unit located within an overlapping coverage area of first and second radio network nodes to simultaneously receive data on a first component carrier and on a second component carrier from the first and second network nodes, and simultaneously transmitting data to the user equipment unit using the first and second component carriers from different radio network nodes in response to determining that the user equipment unit is capable of simultaneously receiving data on the first component carrier and on the second component carrier from different radio network nodes.

31 Claims, 8 Drawing Sheets

(56) References Cited

OTHER PUBLICATIONS

Alcatel-Lucent Shanghai Bell et al; "Support of wider bandwidth for Home eNodeB in LTE-Advanced", 3GPP TSG-RAN WG1 #56, R1-090769, Feb. 9-13, 2009, Athens, Greece; 7 pp.; XP050318629.

Ericsson et al; "Remaining Details for CA-based HetNets", 3GPP TSG WG1 Meeting #62bis, R1-105321, Oct. 11-15, 2010; Xian China, 3pp.; XP050450482.

Qualcomm Europe: "Carrier Aggregation in Heterogeneous Networks" 3GPP TSG-RAN WG1 #55bis, R1-090357, Jan. 12-16, 2009, Ljubljana, Slovenia; 12 pp.; XP050318263.

Ericsson et al; "On technical aspects on Heterogeneous Networks", 3GPP TSG-RAN WG1 #59bis, R1-100061, Jan. 18-22, 2010; Valencia, Spain, 4pp.; XP050417808.

3GPP TR 36.808 V0.3.0 (Aug. 2010) "$3^{rd}$ Generation Partnership Project; Technical Specification Group Radio Access Network; Evolved Universal Terrestrial Radio Access (E-ULTRA); Carrier Aggregation; Base Station (BS) radio transmission and reception" (Release 10) pp. 1-96.

R4-102749, Updates to the work plan for the "Carrier Aggregation for LTE" Bratislava, Slovakia, Jun. 28-Jul. 2, 2010 Nokia, Nokia Siemens Networks.

R4-102578, Text proposal for CA BS TR: Time alignment between carriers, Ericsson, ST-Ericsson 3GPP TSG-RAN WG4 Ad hoc meeting #10-03, Bratislava, Slovakia, Jun. 28-Jul. 2, 2010.

R4-103358, CR, Revision of Time Alignment Error requirement, 3GPP TSG-RAN WG4 meeting #56, Madrid, Spain, Aug. 23-27, 2010.

* cited by examiner

SIGNALLING MECHANISM FOR MULTI-TIERED INTRA-BAND CARRIER AGGREGATION

CROSS REFERENCE TO RELATED APPLICATION

The present application claims the benefit of and priority to U.S. Provisional Patent Application No. 61/391,209, filed Oct. 8, 2010, entitled "Signalling Mechanism for intra band macro+pico cell carrier aggregation UE capabilities," the disclosure of which is hereby incorporated herein by reference in its entirety.

FIELD

The present invention relates to wireless communication networks, and in particular relates to multi-tiered wireless communication networks in which user equipment units are served by radio access nodes having overlapping geographic service areas.

BACKGROUND

The Long Term Evolution (LTE) telecommunication standard uses orthogonal frequency division multiplexing (OFDM) in the downlink and discrete fourier transform (DFT)-spread OFDM in the uplink. Downlink refers to transmissions from a radio base station to a user equipment unit served by the base station, while uplink refers to transmission from the user equipment unit to the base station. In an OFDM system, data is sent simultaneously over a group of orthogonal subcarrier frequencies. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms in duration. Each radio frame consists of ten equally-sized subframes of length $T_{subframe}=1$ ms, as illustrated in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Carrier Aggregation

The recently adopted LTE Rel-8 standard supports bandwidths up to 20 MHz. However, in order to meet the International Mobile Telecommunications (IMT)-Advanced requirements, the 3rd Generation Partnership Project (3GPP) has initiated work on LTE Rel-10. One goal of LTE Rel-10 is to support bandwidths larger than 20 MHz, although it would be desirable for LTE Rel-10 to be backwards compatibile with LTE Rel-8, including spectrum compatibility. Thus, an LTE Rel-10 carrier that is wider than 20 MHz should appear as a number of LTE carriers to an LTE Rel-8 terminal. Each such carrier can be referred to as a Component Carrier (CC).

In particular, for early LTE Rel-10 deployments it can be expected that there will be a smaller number of LTE Rel-10-capable terminals compared to many LTE legacy terminals. Therefore, it is also desirable to ensure an efficient use of a wide carrier by legacy terminals. That is, it should be possible to implement carriers where legacy terminals can be scheduled in all parts of the wideband LTE Rel-10 frequency space. One straightforward way to obtain this would be by means of Carrier Aggregation. Carrier Aggregation implies that an LTE Rel-10 terminal can receive multiple component carriers, where each of the component carriers may have the same structure as a Rel-8 carrier. In a Rel-8 structure, all Rel-8 signals, e.g. primary and secondary synchronization signals, reference signals, and system information are transmitted on each carrier.

Carrier Aggregation is illustrated in FIG. 3. As shown therein, five component carriers CC1 to CC5 each having a bandwidth of 20 MHz may be aggregated to provide a channel have an aggregated bandwidth of 100 MHz. Although illustrated in FIG. 3 as being contiguous in frequency, it will be understood that component carriers that are not contiguous in frequency can be aggregated to provide an increased bandwidth channel.

The number of aggregated component carriers, as well as the bandwidth of the individual component carrier, may be different for the uplink and downlink. In a symmetric configuration, the number of component carriers in the downlink and the uplink is the same. In an asymmetric configuration, the number of component carriers in the uplink is different from the number of component carriers in the downlink. It is important to note that the number of component carriers configured in a cell coverage area may be different from the number of component carriers seen by a terminal. A terminal may, for example, support more downlink component carriers than uplink component carriers, even though the network offers the same number of uplink and downlink component carriers.

During initial access, an LTE Rel-10 terminal may behave in a manner that is similar to an LTE Rel-8 terminal. Upon successful connection to the network, a user equipment unit may, depending on its capabilities and the capabilities of the network, be configured to use additional component carriers in the uplink and downlink. The configuration is based on radio resource control (RRC) signaling. Due to the heavy signaling and the relatively slow speed of RRC signaling, it is expected that user equipment units may be configured to handle multiple component carriers, even though not all of them may be used at any given time. If a user equipment unit is configured to use multiple component carriers, it would have to to monitor all downlink component carriers for control channels, such as the Physical Downlink Control Channel (PDCCH) and the Physical Downlink Shared Channel (PDSCH). This would require the user equipment unit to support a wider receiver bandwidth, higher sampling rates, etc., which may result in high power consumption.

To mitigate these issues, LTE Rel-10 supports both configuration and activation of component carriers. The user equipment unit may monitor only configured and activated component carriers for the PDCCH and PDSCH. Since activation is based on Medium Access Control (MAC) control elements, which are faster than RRC signaling, activation/de-activation can be based on a number of component carriers that are currently required to fulfill the data rate needs at a given time. Upon arrival of large amounts of data, multiple component carriers may be activated and used for data transmission, and then de-activated when no longer needed. In most cases, all but one component carrier, namely the downlink Primary component carrier (DL PCC), can be de-activated. Activation therefore provides the possibility to configure multiple component carriers but only activate them on an as-needed basis. Most of the time, a terminal would have one or very few component carriers activated, potentially resulting in a lower reception bandwidth and thus lower battery consumption.

Scheduling of a component carrier is done on the PDCCH via downlink assignments. Control information on the PDCCH is formatted as a Downlink Control Information (DCI) message. In LTE Rel-8, a user equipment unit only operates with one downlink component carrier and one uplink component carrier. The association between downlink assignment, uplink grants and the corresponding downlink and uplink component carriers is therefore straightforward. In LTE Rel-10, two modes of Carrier Aggregation should be distinguished. The first case is very similar to the operation of multiple Rel-8 terminals. A downlink assignment or uplink grant contained in a DCI message transmitted on a component carrier is either valid for the downlink component carrier itself or for an associated (either via cell-specific or terminal specific linking) uplink component carrier. A second mode of operation augments a DCI message with the Carrier Indicator Field (CIF). A DCI containing a downlink assignment with CIF is valid for that downlink component carrier indicted with CIF and a DCI containing an uplink grant with CIF is valid for the indicated uplink component carrier.

SUMMARY

Some embodiments provide methods of performing intra-band carrier aggregation in a multi-tiered wireless network including a first radio network node that uses a first component carrier in a first frequency band and a second radio network node that uses a second component carrier in the first frequency band. The methods include determining a capability of a user equipment unit located within an overlapping coverage area of the radio network nodes to simultaneously receive data on the first component carrier from the first radio network node and on the second component carrier from the second radio network node, and transmitting first data to the user equipment unit from the first radio network node using the first component carrier simultaneous with a second radio network node transmitting second data to the user equipment unit using the second component carrier in response to determining that the user equipment unit is capable of simultaneously receiving data on the first component carrier from the first radio network node and on the second component carrier from the second radio network node.

The methods may further include receiving first configuration data at the first radio network node identifying the second radio network node and the second component carrier. The first configuration data may be received from an eNodeB in a long term evolution network, a network management node or a configuring node.

The second network node may include a remote radio head, a base station or a relay.

The first component carrier and the second component carrier may have an aggregated bandwidth greater than 20 MHz.

The first component carrier may include a first 20 MHz component carrier in the first frequency band and the second component carrier may include a second 20 MHz component carrier in the first frequency band.

In some embodiments, the first component carrier may include a first 3GPP release-8 component carrier of 1.4, 3, 5, 10, 15 or 20 MHz channel bandwidth in the first frequency band and the second component carrier may include a second 3GPP release-8 component carrier of 1.4, 3, 5, 10, 15 or 20 MHz channel bandwidth component carrier in the first frequency band.

The first radio network node may be configured to transmit data to the user equipment unit using orthogonal frequency division multiplexing (OFDM) modulation scheme that employs an OFDM symbol with a first cyclic prefix having a first predefined cyclic prefix duration, and the second radio network node may be configured to transmit data to the user equipment unit using an OFDM symbol with a second cyclic prefix having a second predefined cyclic prefix duration. A time difference of arrival at the user equipment unit for transmissions from the first and second radio network nodes may be greater than a smaller of the first and second cyclic prefix durations.

Determining the capability of the user equipment unit to simultaneously receive data on the first component carrier from the first radio network node and on the second component carrier from the second radio network node may include receiving second configuration data from the user equipment unit. The second configuration data may identify the capability of the user equipment unit to simultaneously receive data on intra-band carrier frequencies from both the first radio network node and the second radio network node.

The second configuration data may specify a number of fast fourier transform processors included in the user equipment unit.

The second configuration data may specify a maximum time difference of reception signals from the first and second component carriers that the user equipment unit may be capable of handling.

The determined capability of the wireless terminal may be signaled to a third network radio node, such as a target node for performing a handover.

Determining the capability of the user equipment unit to simultaneously receive data on the first component carrier from the first radio network node and on the second component carrier from the second radio network node may include analyzing a reception performance of the user equipment unit.

Analyzing the reception performance of the user equipment unit may include simultaneously transmitting data to the user equipment unit from the first radio network node using the first component carrier and transmitting data to the user equipment unit from the second radio network node using the second component carrier, and analyzing the reception performance of the user equipment unit in response to the simultaneous transmissions.

Analyzing the reception performance of the user equipment unit may include transmitting data to the user equipment unit from only the first radio network node using both the first component carrier and the second component carrier, and comparing the reception performance of the user equipment unit in response to the simultaneous transmissions from both the first and second radio network nodes to the reception performance of the user equipment unit in response to the transmission from only the first radio network node.

Analyzing the reception performance of the user equipment unit may include analyzing the response of the user equipment unit to a hybrid ARQ request.

Determining the capability of the user equipment unit to simultaneously receive data on the first component carrier from the first radio network node and on the second component carrier from the second radio network node may include determining that the user equipment unit may be capable of performing both intra-band carrier aggregation and inter-band carrier aggregation.

A multi-tiered wireless network according to some embodiments includes a first radio network node configured to transmit information using a first component carrier in a first frequency band in a first coverage area, and a second radio network node configured to transmit information using a second component carrier in the first frequency band in a second coverage area that overlaps geographically with the first coverage area in an overlapping coverage area. The first radio network node is configured to receive first configuration data identifying the second radio network node and the second component carrier. The first radio network node is further configured to determine a capability of a user equipment unit located within the overlapping coverage area to simultaneously receive data on the first component carrier from the first radio network node and on the second component carrier from the second radio network node.

The first radio network node is further configured to transmit first data to the user equipment unit from the first radio network node using the first component carrier in a first time frame. The second radio network node is configured to transmit second data to the user equipment unit using the second component carrier in the first time frame in response to the first radio network node determining that the user equipment unit is capable of simultaneously receiving data on the first component carrier from the first radio network node and on the second component carrier from the second radio network node.

The first component carrier and the second component carrier may have an aggregated bandwidth greater than 20 MHz.

The first component carrier may include a first 20 MHz component carrier in the first frequency band and the second component carrier includes a second 20 MHz component carrier in the first frequency band.

In some embodiments, the first component carrier may include a first 3GPP release-8 component carrier of 1.4, 3, 5, 10, 15 or 20 MHz channel bandwidth in the first frequency band and the second component carrier may include a second 3GPP release-8 component carrier of 1.4, 3, 5, 10, 15 or 20 MHz channel bandwidth component carrier in the first frequency band.

The first and second radio network nodes may be configured to transmit data to the user equipment unit using orthogonal frequency division multiplexing (OFDM) modulation scheme that employs an OFDM symbol with a cyclic prefix having a predefined cyclic prefix duration, and a time difference of arrival at the user equipment unit for transmissions from the first and second radio network nodes may be greater than the cyclic prefix duration.

The first radio network node may be configured to determine the capability of the user equipment unit to simultaneously receive data on the first component carrier from the first radio network node and on the second component carrier from the second radio network node in response to second configuration data received from the user equipment unit. The second configuration data may identify the capability of the user equipment unit to simultaneously receive data on intra-band carrier frequencies from both the first radio network node and the second radio network node.

The second configuration data may specify a number of fast fourier transform processors included in the user equipment unit.

The second configuration data may specify a maximum time difference of reception signals from the first and second component carriers that the user equipment unit may be capable of handling.

The first radio network node may be configured to determine the capability of the user equipment unit to simultaneously receive data on the first component carrier from the first radio network node and on the second component carrier from the second radio network node by analyzing a reception performance of the user equipment unit.

The first radio network node may be configured to analyze the reception performance of the user equipment unit by simultaneously transmitting data to the user equipment unit from the first radio network node using the first component carrier and transmitting data to the user equipment unit from the second radio network node using the second component carrier, and analyzing the reception performance of the user equipment unit in response to the simultaneous transmissions.

The first radio network node may be configured to analyze the reception performance of the user equipment unit by transmitting data to the user equipment unit from only the first radio network node using both the first component carrier and the second component carrier, and comparing the reception performance of the user equipment unit in response to the simultaneous transmissions from both the first and second radio network nodes to the reception performance of the user equipment unit in response to the transmission from only the first radio network node.

The first radio network node may be configured to analyze the reception performance of the user equipment unit by analyzing the response of the user equipment unit to a hybrid ARQ request.

The first radio network node may be configured to determine the capability of the user equipment unit to simultaneously receive data on the first component carrier from the first radio network node and on the second component carrier from the second radio network node by determining that the user equipment unit may be capable of performing both intra-band carrier aggregation and inter-band carrier aggregation.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Figure 1:
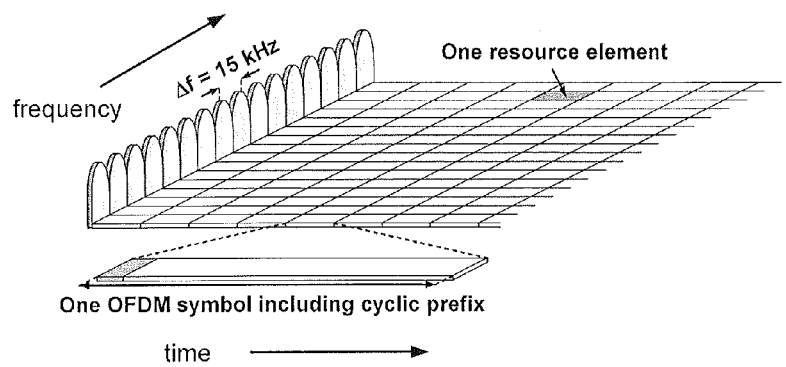
FIG. 1 illustrates an orthogonal frequency division multiple access (OFDMA) symbol structure.
Figure 2:
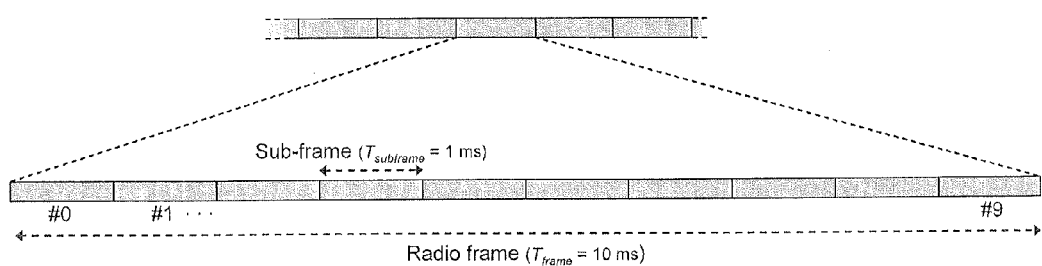
FIG. 2 illustrates a Long Term Evolution (LTE) radio frame.
Figure 3:
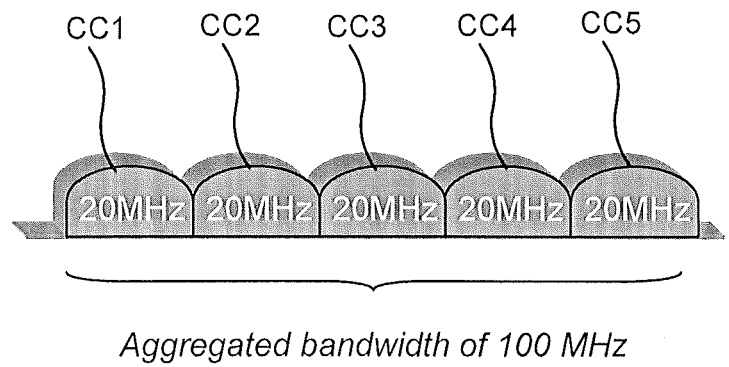
FIG. 3 illustrates aggregation of multiple component carriers.

Embodiments of the present inventive concept support intra-band carrier aggregation by user equipment units. In particular, embodiments of the present inventive concept provide methods of performing intra-band carrier aggregation in a multi-tiered wireless network including a first cell served by a first radio network node using a first component carrier in a first frequency band and a second cell that overlaps geographically with the first cell in an overlapping geographic region and that is served by a second radio network node using a second component carrier in the first frequency band.

For example, the first cell could be a macro cell, while the second cell could be a pico cell located partly or entirely within the macro cell. Embodiments of the present inventive concept enable both the first radio network node and the second radio network node to communicate with a user equipment unit using component carriers in the same frequency band.

The methods include receiving first configuration data at the first radio network node identifying the second radio network node and the second component carrier.

The first radio network node determines whether a user equipment unit located within the overlapping geographic region is capable of simultaneously receiving data on the first component carrier from the first radio network node and on the second component carrier from the second radio network node.

In response to determining that the user equipment unit is capable of simultaneously receiving data on the first component carrier from the first radio network node and on the second component carrier from the second radio network node, the first and second radio network nodes simultaneously transmit first data to the user equipment unit using the first and second second component carriers.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Carrier Aggregation in Heterogeneous Network Deployments

A basic heterogeneous network deployment scenario includes two cell layers, referred to herein as a "macro layer" and a "pico layer", respectively. In a heterogeneous network, all layers may operate on the same carrier frequency. It will be appreciated, however, that the terminology used herein is for illustrative purposes only, and that the inventive concept is not limited to networks using particular terminology. In particular, a "pico layer" can be referred to as a micro layer, a conventional outdoor or indoor pico layer, a layer consisting of relays, a Home eNB (HeNB) layer, and/or a Remote Radio Head (RRH). A RRH may also be referred to as a remote radio unit (RRU).

One layer is typically served by one type of base station class or type. For example the macro layer in a heterogeneous network is served by one or more macro base stations or wide area base stations, while the pico layer is served by pico base stations. The radio base station classes or types in turn may be characterized by a number of factors and requirements, such as minimum coupling loss, maximum output power, receiver sensitivity, frequency errors, etc.

The Evolved UMTS Terrestrial Radio Access Network (E-UTRAN or eUTRAN) is the air interface of 3GPP's Long Term Evolution (LTE) upgrade path for mobile networks. In E-UTRAN, three radio base station classes or types are specified: wide area radio base stations, local area radio base stations and home base stations, which primarily serving macro cells, pico cells and home environments, respectively.

In E-UTRAN, a relay station, or relay, is also being currently standardized. A relay may correspond to a power class similar to that of a pico or micro base station. In UTRAN, four radio base station classes or types are specified: wide area radio base stations, medium range radio base stations, local area radio base stations and home base stations, which primarily serve macro cells, micro cells, pico cells and home environments, respectively. Furthermore, due to the typically large minimum coupling loss between the user equipment unit and the base station, the macro base station may also operate at a higher output power compared to a lower class base station. For example, a pico base station and a home base station may operate at a maximum output power of 24 dBm and 20 dBm, respectively. On the other hand, a wide area base station serving the macro layer may operate at 43 dBm or even at higher power in case the bandwidth is large. For example, a wide area base station mayh operate at 46 dBm for 10 MHz.

A user equipment unit can simultaneously receive data over multiple component carriers. This is referred to as carrier aggregation. In LTE Rel-10, there is no restriction where the component carriers can originate from, however. Thus, a pico base station can transmit data to a user equipment unit over one component carrier while a macro base station can transmit data to the user equipment unit over a different component carrier.

Radio frames may be time aligned at the macro and pico cells (or between cells belonging to any set of layers in a heterogeneous network deployment) when it comes to the downlink transmission. However, the user equipment unit cannot assume that all component carriers will arrive at the same time if one carrier originates from the macro site and another carrier from the pico site.

In LTE Rel-10, the user equipment unit will be capable of handling inter-band component carriers that originate from different base stations, such as from a macro base station and a pico base station. That is, the pico cell can be placed anywhere within the coverage area of the macro cell, when aggregating the macro and pico component carriers together.

However, intra-band carrier aggregation (that is, aggregation of component carriers selected from the same frequency band) may be restricted to situations where the site to site distance between the macro cell base station and the pico cell base station is less than the distance that corresponds to the length of a Cyclic Prefix (CP) to ensure that the component carriers transmitted by the macro cell base station and the pico cell base station arrive at the user equipment unit within a time frame that is less than the duration of the cyclic prefix. In some embodiments, the macro cell base station and the pico cell base station may use cyclic prefixes that have different durations. In that case, it may be necessary to ensure that the component carriers transmitted by the macro cell base station and the pico cell base station arrive at the user equipment unit within a time frame that is less than the duration of the smaller of the two cyclic prefixes.

The term "frequency band" refers to a range of contiguous frequencies that are used for uplink and/or down link communication. For example, E-UTRAN defines LTE frequency bands 1-5, 7-14, 17-21 and 33-40 having bandwidths ranging from 10 MHz up to 100 MHz as shown in Table 1, below.

For example, the maximum site to site distance may be limited to less than about 1000 meters.

Figure 4:
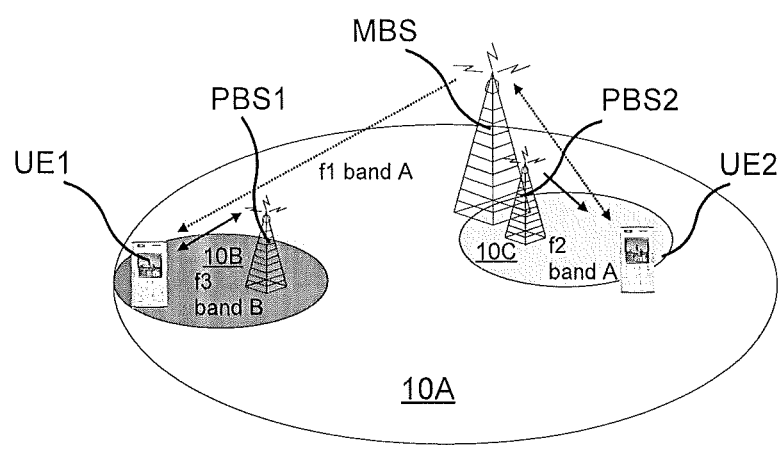
FIGS. 4 and 5 illustrate communications within radio network nodes in a multi-tiered network having overlapping geographic service areas.

FIG. 4 illustrates exemplary placement of pico cells within a macro cell. As shown therein, a macro base station MBS serves a macro coverage area 10A. A first pico base station PBS1 serves a first pico coverage area 10B that at least partially overlaps the macro coverage area 10A, and a second pico base station PBS2 serves a second pico coverage area 10C that also at least partially overlaps the macro coverage area 10A The second pico base station is substantially co-located with the macro base station. A first user equipment unit UE1 is located within the macro coverage area and within the first pico coverage area 10B. A second user equipment unit UE2 is located within the macro coverage area and within the second pico coverage area 10C.

TABLE 1

LTE Frequency Band Definitions
E-UTRAN frequency band

| Band | Uplink low | Uplink high | Downlink low | Downlink high | Bandwidth |
| --- | --- | --- | --- | --- | --- |
| 1 | 18000 | 18599 | 0 | 599 | 60 MHz |
|  | 1920 MHz | 1980 MHz | 2110 MHz | 2170 MHz |  |
| 2 | 18600 | 19199 | 600 | 1199 | 60 MHz |
|  | 1850 MHz | 1910 MHz | 1930 MHz | 1990 MHz |  |
| 3 | 19200 | 19949 | 1200 | 1949 | 75 MHz |
|  | 1710 MHz | 1785 MHz | 1805 MHz | 1880 MHz |  |
| 4 | 19950 | 20399 | 1950 | 2399 | 45 MHz |
|  | 1710 MHz | 1755 MHz | 2110 MHz | 2155 MHz |  |
| 5 | 20400 | 20649 | 2400 | 2649 | 25 MHz |
|  | 824 MHz | 849 MHz | 869 MHz | 894 MHz |  |
| 7 | 20750 | 21449 | 2750 | 3449 | 70 MHz |
|  | 2500 MHz | 2570 MHz | 2620 MHz | 2690 MHz |  |
| 8 | 21450 | 21799 | 3450 | 3799 | 35 MHz |
|  | 880 MHz | 915 MHz | 925 MHz | 960 MHz |  |
| 9 | 21800 | 22149 | 3800 | 4149 | 35 MHz |
|  | 1749.9 MHz | 1784.9 MHz | 1844.9 MHz | 1879.9 MHz |  |
| 10 | 22150 | 22749 | 4150 | 4749 | 60 MHz |
|  | 1710 MHz | 1770 MHz | 2110 MHz | 2170 MHz |  |
| 11 | 22750 | 22949 | 4750 | 4949 | 20 MHz |
|  | 1427.9 MHz | 1447.9 MHz | 1475.9 MHz | 1495.9 MHz |  |
| 12 | 23010 | 23179 | 5010 | 5179 | 17 MHz |
|  | 699 MHz | 716 MHz | 729 MHz | 746 MHz |  |
| 13 | 23180 | 23279 | 5180 | 5279 | 10 MHz |
|  | 777 MHz | 787 MHz | 746 MHz | 756 MHz |  |
| 14 | 23280 | 23379 | 5280 | 5379 | 10 MHz |
|  | 788 MHz | 798 MHz | 758 MHz | 768 MHz |  |
| 17 | 23730 | 23849 | 5730 | 5849 | 12 MHz |
|  | 704 MHz | 716 MHz | 734 MHz | 746 MHz |  |
| 18 | 23850 | 23999 | 5850 | 5999 | 15 MHz |
|  | 815 MHz | 830 MHz | 860 MHz | 875 MHz |  |
| 19 | 24000 | 24149 | 6000 | 6149 | 15 MHz |
|  | 830 MHz | 845 MHz | 875 MHz | 890 MHz |  |
| 20 | 24150 | 24449 | 6150 | 6449 | 30 MHz |
|  | 832 MHz | 862 MHz | 791 MHz | 821 MHz |  |
| 21 | 24450 | 24599 | 6450 | 6599 | 15 MHz |
|  | 1447.9 MHz | 1462.9 MHz | 1495.9 MHz | 1510.9 MHz |  |
| 33 | 36000 | 36199 | 36000 | 36199 | 20 MHz |
|  | 1900 MHz | 1920 MHz | 1900 MHz | 1920 MHz |  |
| 34 | 36200 | 36349 | 36200 | 36349 | 15 MHz |
|  | 2010 MHz | 2025 MHz | 2010 MHz | 2025 MHz |  |
| 35 | 36350 | 36949 | 36350 | 36949 | 60 MHz |
|  | 1850 MHz | 1910 MHz | 1850 MHz | 1910 MHz |  |
| 36 | 36950 | 37549 | 36950 | 37549 | 60 MHz |
|  | 1930 MHz | 1990 MHz | 1930 MHz | 1990 MHz |  |
| 37 | 37550 | 37749 | 37550 | 37749 | 20 MHz |
|  | 1910 MHz | 1930 MHz | 1910 MHz | 1930 MHz |  |
| 38 | 37750 | 38249 | 37750 | 38249 | 50 MHz |
|  | 2570 MHz | 2620 MHz | 2570 MHz | 2620 MHz |  |
| 39 | 38250 | 38649 | 38250 | 38649 | 40 MHz |
|  | 1880 MHz | 1920 MHz | 1880 MHz | 1920 MHz |  |
| 40 | 38650 | 39649 | 38650 | 39649 | 100 MHz |
|  | 2300 MHz | 2400 MHz | 2300 MHz | 2400 MHz |  |

Although illustrated as pico base stations, the base stations PBS1 and PBS2 could be radio resource heads, micro base stations, home base stations, relays, or any other radio access points that provide coverage for a geographic area that least partially overlaps the geographic service area of the macro base station. Base stations, including macro base stations, pico base stations and other base stations, can be referred to generically as "radio network nodes."

The first user equipment unit UE1 aggregates (i.e., simultaneously receives and processes) a first component carrier CC1 on frequency f1 in band A sent by the macro base station MBS and a second component carrier CC2 on frequency f3 in band B sent by the first pico base station PBS1. Thus, the first user equipment unit UE1 is performing inter-band carrier aggregation of component carriers sent by the macro base station and the first pico base station.

The second user equipment unit UE2 aggregates the first component carrier CC1 on frequency f1 in band A sent by the macro base station MBS and the second component carrier CC2 on frequency f2, which is also in band A, sent by the second pico base station PBS2. Thus, the second user equipment unit UE2 is performing intra-band carrier aggregation of component carriers transmitted from the co-located macro and second pico base stations.

As noted above, for intra-band carrier aggregation (e.g., in which f1 and f2 both belong to the same frequency band), it is generally important for the macro base station and the pico base station to be located very close to one another, such as within 1000 meters, to ensure that the component carriers arrive at the user equipment unit at very close points in time.

In future releases of 3GPP, intra band macro+pico deployments may be considered. For example, FIG. 5 illustrates a scenario in which a wireless terminal performs intra-band carrier aggregation of component carriers transmitted by network nodes that are remote from one another.

Figure 5:
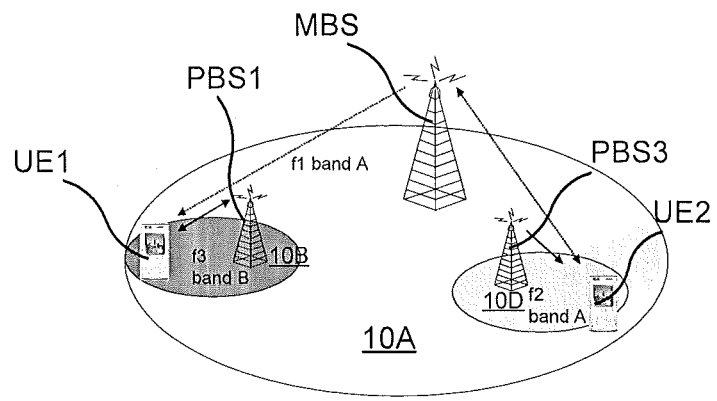

Referring to FIG. 5, a macro base station MBS serves a macro coverage area 10A. A first pico base station PBS1 serves a first pico coverage area 10B that at least partially overlaps the macro coverage area 10A, and a third pico base station PBS3 serves a third pico coverage area 10D that also at least partially overlaps the macro coverage area 10A. The third pico base station PBS3 is located at a large distance from the macro base station MBS, e.g., greater than 1000 meters away from the macro base station. A first user equipment unit UE1 is located within the macro coverage area and within the first pico coverage area 10B. A second user equipment unit UE2 is located within the macro coverage area 10A and within the third pico coverage area 10D.

The first user equipment unit UE1 aggregates (i.e., simultaneously receives and processes) a first component carrier CC1 on frequency f1 in band A sent by the macro base station MBS and a second component carrier CC2 on frequency f3 in band B sent by the first pico base station PBS1. Thus, the first user equipment unit UE1 is performing inter-band carrier aggregation of component carriers sent by the macro base station and the first pico base station.

The second user equipment unit UE2 aggregates the first component carrier CC1 on frequency f1 in band A sent by the macro base station MBS and the second component carrier CC2 on frequency f2, which is also in band A, sent by the third pico base station PBS3. Thus, the second user equipment unit UE2 is performing intra-band carrier aggregation of component carriers transmitted from the remotely located macro and second pico base stations.

That is, some user equipment units may be equipped with sufficient signal processing capabilities that it can perform intra-band carrier aggregation on component carriers that are transmitted by non co-located base stations. Thus, the pico cell can overlap anywhere in the macro coverage area. Embodiments of the invention may be generally deployed in systems that have large site to site distances of macro and pico cells, and may enable the base stations to determine which user equipment units, if any, in their coverage areas are capable of performing intra-band carrier aggregation, and, more particularly, to determine which user equipment units, if any, in their coverage areas are capable of performing intra-band carrier aggregation of component carriers that are not guaranteed to arrive at the user equipment unit within the time duration of a cyclic prefix.

Some embodiments provide methods of operation of a user equipment unit for signaling its capability to a network node indicating whether the user equipment unit is capable of supporting intra band carrier aggregation of component carriers from non co-located base stations in a multi-layered deployment and/or from base stations whose inter-site distance is not restricted by a cyclic prefix length, where component carriers originate from different, non co-located sites. In this context, a general macro/pico deployment refers to a deployment in which the pico site can be anywhere in the macro coverage area, so that the inter-site distance may not be restricted by the cyclic prefix.

Some further embodiments provide methods of operation in a radio network node, such as a serving eNodeB, for identifying the user equipment units within the coverage area of the radio network node that are capable of supporting intra-band carrier aggregation of component carriers sent by non co-located radio network nodes whose inter-site distance is not restricted by the cyclic prefix.

In some embodiments, a user equipment unit may notify the radio network node of its carrier aggregation capabilities by explicit signaling to the radio network node.

In other embodiments, the carrier aggregation capabilities of a user equipment unit may be obtained by a radio network node through autonomous detection. The autonomous detection may be based on one or more criteria, such as, by comparing the performance of intra-band carrier aggregation when component carriers are sent by co-located sites with that of the intra-band carrier aggregation when component carriers are sent by non co-located sites. As used herein, "co-located" means that the locations of the radio network nodes are closer than the distance corresponding to the length of a cyclic prefix (e.g., the shortest cyclic prefix used by either of the two radio network nodes), while "non co-located" means that the locations of the radio network nodes are farther apart than the distance corresponding to the length of a cyclic prefix.

Still further embodiments provide methods of operation of a radio network node, in which the radio network node decides whether a user equipment unit should perform carrier aggregation of component carriers transmitted from non co-located radio network nodes. For example, carrier aggregation of component carriers transmitted from a macro base station and a pico base station or from a macro base station and a radio resource head, or between any two non co-located base stations. The decision may be based on the identification of the user equipment unit capability.

According to some embodiment, it is also possible to schedule resources for a legacy user equipment unit in such a way that only resources from a single radio network node are used if a legacy user equipment unit is in an area where aggregation requires special user equipment unit capabilities, such as when the macro and pico sites are using intra band aggregation and have a large site to site distance. An advanced eNodeB may even delay/advance transmissions to legacy user equipment units from one or multiple sites to ensure that the carriers arrive within the cyclic prefix at the user equipment unit. In this way, the area in which even legacy user equipment units can utilize carrier aggregation increases.

Figure 6:
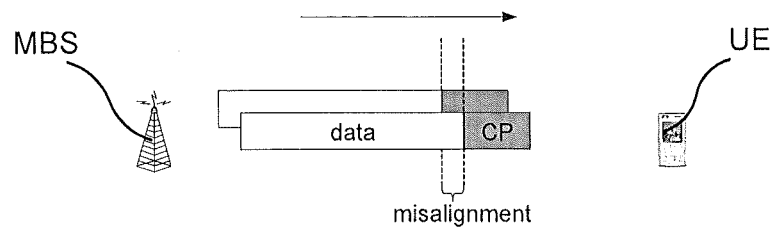
FIG. 6 illustrates misalignment of intra-band signals sent in different component carriers.

In a homogeneous environment (i.e., a single tiered environment without overlapping coverage areas), intra band carrier aggregation relies on the fact that the component carriers are time aligned at the antenna connectors of the radio network node, and that the user equipment unit can handle any misalignment when receiving the signals, as long as it is within a Cyclic Prefix (CP), e.g. within 5 µs for a normal cyclic prefix, as illustrated in FIG. 6.

In a heterogeneous (i.e. tiered) environment, the radio network nodes of different layers or tiers (e.g. macro, micro, pico, relay, femto, etc.) may operate in the same frequency bands. Furthermore, network nodes in different layers may not be co-located. The carrier aggregation of component carriers sent by different radio network nodes enables a high data rate of transmission. However, having large or even medium inter-site distances between the nodes transmitting the component carriers to be aggregated by the user equipment unit may lead to large time of arrival difference for signals arriving from the different nodes. For example, the difference in time of arrival may exceed the cyclic prefix length. Thus, the aggregation of component carriers from macro and pico in a heterogeneous macro/pico deployment may lead to very different reception times at the user equipment unit receiver. Another example is that of a macro base station and a remote radio head (RRH), which may have large inter-site distances leading to very large difference in the arrival times of the component carriers from these nodes at the user equipment unit.

Figure 7:
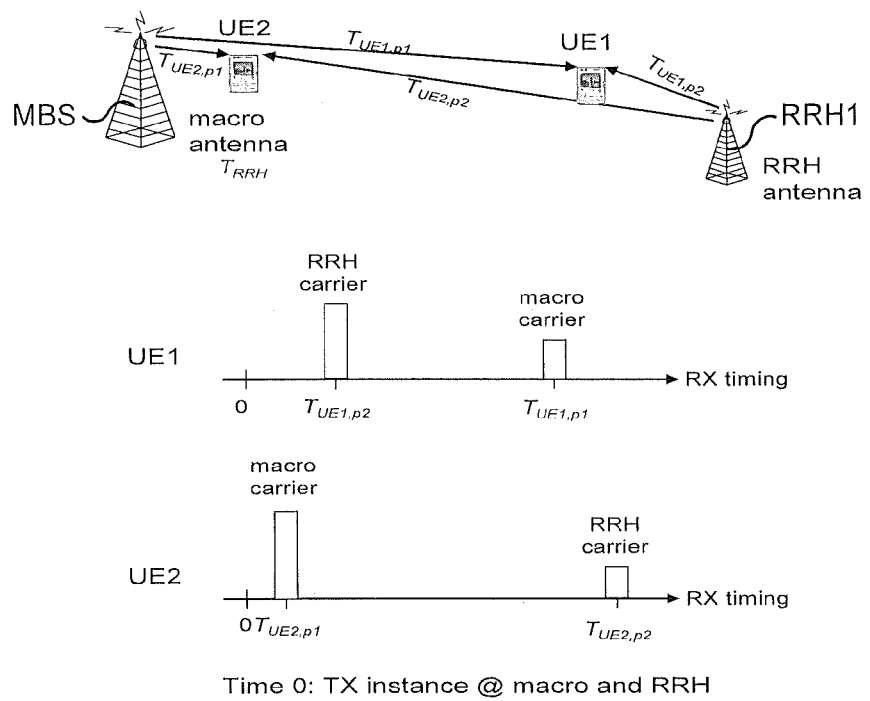
FIG. 7 illustrates timing differences in the reception of intra-band signals from non co-located radio network nodes.

FIG. 7 illustrates intra-band carrier aggregation in a heterogeneous macro/pico implementation. As shown therein, a macro base station MBS and a remote radio head RRH1 both communicate with two user equipment units, UE1 and UE2. The first user equipment unit UE1 is physically closer to the remote radio head RRH, while the second user equipment unit UE2 is physically closer to the macro base station MBS.

Timing diagrams for reception of component carriers from the macro base station MBS and the remote radio head RRH are shown for both user equipment units UE1, UE2. As shown in FIG. 7, assuming that both component carriers are sent simultaneously at time t=0 from macro base station MBS and the remote radio head RRH, the time delay before the signal from the macro base station MBS at the first user equipment unit is denoted $T_{UE1,p1}$, which is greater than the time delay, denoted $T_{UE1,p2}$, before the signal from the remote radio head RRH reaches the first user equipment unit. Similarly, the time delay before the signal from the macro base station MBS at the second user equipment unit is denoted $T_{UE2,p1}$, which is greater than the time delay, denoted $T_{UE2,p2}$, before the signal from the remote radio head RRH reaches the second user equipment unit.

The 3GPP release 10 specification allows heterogeneous macro/pico configurations and inter-band carrier aggregation, for example, where the macro carrier and the pico carrier belong to different operating frequency bands (e.g. CC1 and CC2 belong to band A and band B respectively).

However, the 3GPP release 10 specification restricts intra-band carrier aggregation to cases where the macro and pico carriers are within the cyclic prefix (e.g. 5 µs) when it comes to the relative delay in signal reception at the user equipment unit receiver. In intra-band carrier aggregation, all component carriers belong to the same operating frequency band (e.g. CC1 and CC2 belong to the band A).

However, it is possible to implement a user equipment unit which can handle these large differences of signal reception from multiple nodes by, for example, including multiple FFT/IFFT processors in the user equipment unit, each of which can independently process a different component carrier. For example, a user equipment unit 100 capable of performing intra-band carrier aggregation of non co-located component carriers is illustrated in FIG. 8.

Figure 8:
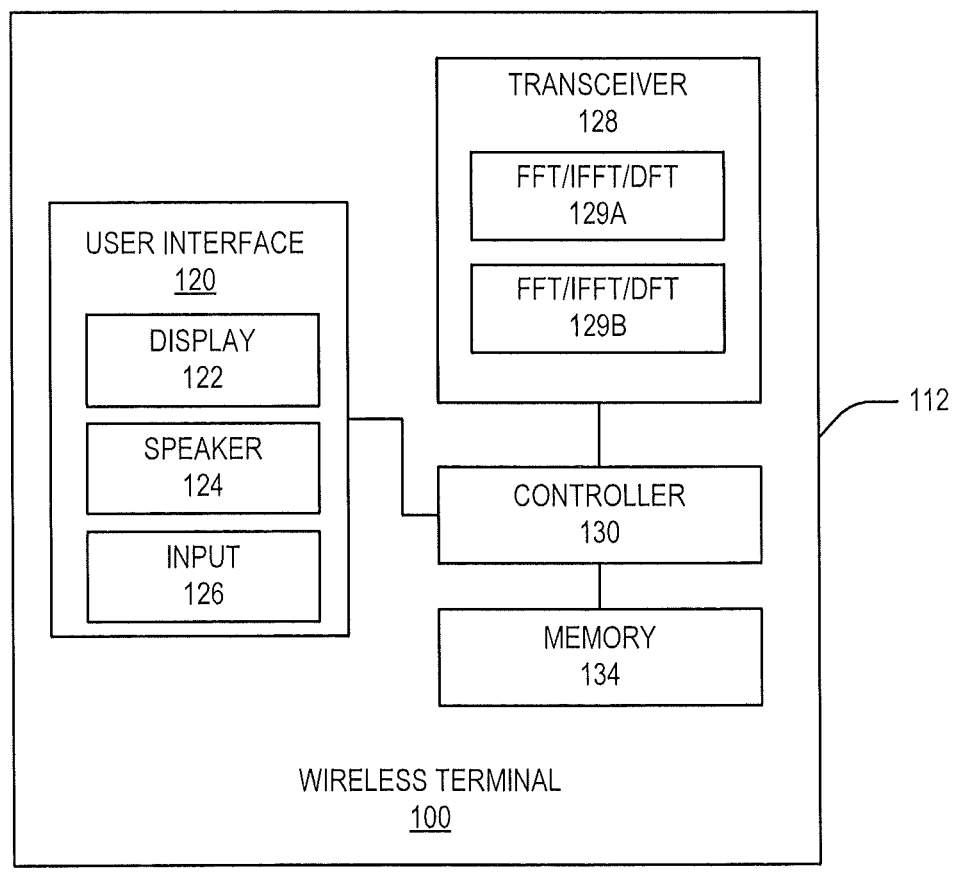
FIG. 8 illustrates a user equipment unit according to some embodiments.

Referring to FIG. 8, an exemplary user equipment unit 100 in accordance with some embodiments of the present invention is illustrated. The user equipment unit 100 is configured to communicate data with one or more radio network nodes.

The user equipment unit 100 may be a mobile radiotelephone in a radiotelephone communication system.

The user equipment unit 100 in the illustrated embodiments includes a portable housing assembly 112, a controller 130, a transceiver 128, a user interface 120, and a memory 134. The user interface 120 may include a display 122, a speaker 124, and at least one input device 126. The foregoing components of the user equipment unit 100 may be included in many conventional user equipment units and their functionality is generally known to those skilled in the art.

The display 122 may be any suitable display screen assembly. For example, the display 122 may be a liquid crystal display (LCD) with or without auxiliary lighting (e.g., a lighting panel). In some cases the user equipment unit 100 may be capable of playing video content of a particular quality. For example, a user equipment unit 100 may be configured to display a video stream having a particular aspect ratio, such as 16:9 or 4:3. A number of standard video formats have been proposed for mobile terminals, including Quarter VGA (QVGA, 320×240 pixels), Common Intermediate Format (CIF, 360×288 pixels) and Quarter Common Intermediate Format (QCIF, 180×144 pixels). Moreover, some user equipment units may have multiple display screens having different display capabilities. Thus, a user equipment unit 100 may be capable of displaying video in one or more different display formats.

The user interface 120 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 124 generates sound responsive to an input audio signal. The user interface 120 can also include a microphone coupled to an audio processor that is configured to generate an audio data stream responsive to sound incident on the microphone.

The controller 130 may support various functions of the user equipment unit 100. The controller 130 can be any commercially available or custom microprocessor, for example. In use, the controller 130 of the user equipment unit 100 may generate a display image on the display 122. In some embodiments, however, a separate signal processor and/or video chip (not shown) may be provided in the user equipment unit 100 and may be configured to generate a display image on the display 122.

The memory 134 is configured to store digital information signals and data such as a digital multimedia files (e.g., digital audio, image and/or video files).

The transceiver 128 is configured to communicate data over one or more wireless interfaces to a radio network node as discussed herein. In some embodiments, the user equipment unit 100 can communicate via the radio network node(s) of a network using one or more cellular communication protocols such as, for example, Long Term Evolution using Orthogonal Frequency Division Multiple Access (OFDMA).

Other communication protocols/access methods may be supported, such as Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS).

The transceiver 128 may include a transmitter circuit and a receiver circuit, which respectively transmit outgoing radio frequency signals and receive incoming radio frequency signals, such as voice and data signals, via an antenna. The transceiver 128 may include a short range transmitter and receiver, such as a Bluetooth transmitter and receiver. The antenna may be an embedded antenna, a retractable antenna or any antenna known to those having skill in the art without departing from the scope of the present invention.

The radio frequency signals transmitted between the user equipment unit 100 and the network, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information.

The transeiver 128 may further include one or more FFT/IFFT/DFT processors 129A, 129B for processing component carriers in an OFDMA communication system. Having multiple FFT/IFFT/DFT processors 129A, 129B may enable the user equipment unit 100 to perform intra- and/or inter-band carrier aggregation.

Some embodiments of the present inventive concept provide a signaling mechanism in which the capability of a user equipment unit to perform intra-band carrier aggregation from geographically separated (i.e., non co-located) radio network nodes is communicated to the network, and the network schedules resources accordingly. That is, the network may aggregate component carriers within the same band from different radio network nodes in response to the indicated capability of a user equipment unit to receive such transmissions.

Alternatively, if a user equipment unit is capable of handling intra-band carrier aggregation of component carriers transmitted by non co-located radio network nodes, or is capable of handling component carriers with large differences of signal reception times from multiple sites, the network node (e.g. the macro serving node) may autonomously detect the capability of the user equipment unit by observing its performance and/or response to particular types of communications. For example, the network node can observe the response of a user equipment unit to a HARQ request transmitted by the network node.

According to some embodiments, a network node can be informed whether the user equipment unit supports intra-band carrier aggregation of component carriers, transmitted from macro and pico network nodes in a heterogeneous macro/pico deployment.

The network node, or other intelligence residing within the network, may decide whether or not to cause a particular user equipment unit to perform intra-band carrier aggregation based on the information received from the user equipment unit about the user equipment unit's capability.

In other embodiments, the network node, or other intelligence residing within the network, may decide whether or not to cause the user equipment unit to perform intra-band carrier aggregation based on autonomous detection in the event that explicit user equipment unit capability information is not available to the network.

Accordingly, systems/methods according to some embodiments may allow enhanced flexibility when planning and implementing a heterogeneous macro/pico network.

Signaling of user equipment unit capability

Figure 9:
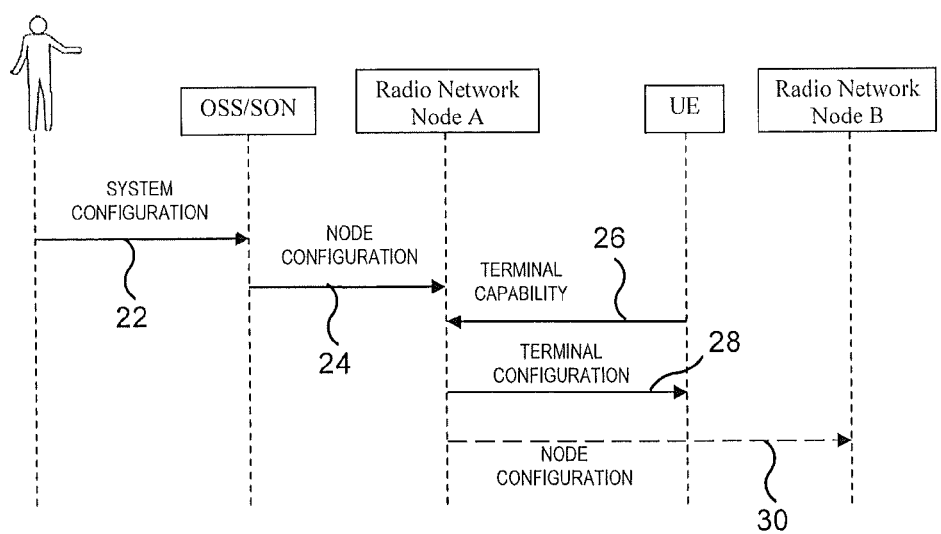
FIG. 9 illustrates example message flows among radio network nodes and a user equipment unit according to some embodiments.

As noted above, in some embodiments, a network node can be informed whether the user equipment unit supports intra-band carrier aggregation of component carriers transmitted from macro and pico network nodes in a heterogeneous macro/pico deployment. FIG. 9 illustrates configuration data flows according to some embodiments.

Referring to FIG. 9, an operator may enter system configuration data in a network node, such as an Operating and Support System (OSS) or Operation and Maintenance (OAM) node, which is capable of configuring a radio network node, such as a macro base station. The OSS/OAM node receives and stores the system configuration data.

Another example is that of a self organizing network (SON) node, which can also configure a radio network node. In general, the network configuration data 22 is provided to a network node that is configured to perform the network management or configuration task, including a centralized network node, a base station, etc.

The system configuration data may define intra-band relationships between network nodes, typically including at least one macro network node and a plurality of pico network nodes that overlap the macro node. For example, the system configuration data may define whether a given radio network node should support inter- and/or intra-band carrier aggregation, and the identities of other nodes that support geographic service areas that may overlap with the geographic service area of the radio network node. The system configuration data may also detail which macro and pico network nodes have carriers which belong to the same operating band and could be aggregated together.

The OSS/SON node may update the configuration of a radio network node A, which may include an eNodeB radio network node by means of node configuration data 24. That is, the OSS/SON may configure the radio network node A by informing the radio network node A about available intra-band pico nodes within its coverage area.

The user equipment unit UE may signal its capability to the radio network node A by means of a terminal capability message 26. The terminal capability message 26 can be expressed in different forms. For example, the terminal capability message 26 may explicitly indicate that the user equipment unit UE supports inter-band carrier aggregation, intra-band carrier aggregation from co-located nodes, and/or intra-band carrier aggregation from non co-located nodes. The terminal capability message 26 can either dedicated to indicating its carrier aggregation capability, or it can be included in signaling related to other capabilities. For example, a particular capability and/or feature may be associated with carrier aggregation, and the terminal capability message 26 may indicate the capability and/or feature, which also constitutes an indication of the carrier aggregation capability of the user equipment unit.

In other embodiments, the user equipment unit UE may indicate that it can perform intra-band carrier aggregation in heterogeneous network. In order to handle intra-band carrier aggregation in such scenarios (e.g. macro/pico, macro/RRH or otherwise between any non co-located nodes with large inter-site distance) the user equipment unit UE may require a special hardware configuration, such as having separate FFT/IFFT/DFT processors for handling each component carrier. Thus, the terminal capability information contained in the terminal capability message 26 may also include the number of FFT/IFFT/DFT processors in the user equipment unit, or like. The user equipment unit capability information may also indicate the maximum time difference (ΔT) of different component carriers in the same frequency band that can be aggregated by the user equipment unit.

The user equipment unit may report its capability to the network node during connection setup, before or after handover, or whenever requested by the network node.

In response to the user equipment unit capability information, the network node may send a terminal configuration message 28 to the user equipment unit UE indicating to the user equipment unit which component carriers it should configure for carrier aggregation.

The user equipment unit capability information may also be transmitted over an interface between network nodes in the communications system via a node configuration message 30, for example, e.g. over the X2 interface between eNode Bs or between an eNode B and an, RRH or between any set of network nodes. For example the capability information may be provided by a serving network node (e.g. serving eNode B) to a target eNode B at the time of handover. The user equipment unit capability information may be exchanged between the nodes transparently (e.g. in transparent container) or non-transparently (i.e. the receiving node reads the information before sending it to another node).

The user equipment unit UE may be configured to utilize both macro- and pico-intra-band resources when doing intra band carrier aggregation if the terminal configuration data so allows, the user equipment unit is capable of such carrier aggregation, and the network decides to schedule data on carriers from both the macro and pico cells.

Autonomous detection of user equipment unit capability

In some embodiments, the network may autonomously attempt to determine if a user equipment unit is capable of performing intra-band carrier aggregation of component carriers sent by non co-located nodes. Autonomous detection of user equipment unit capability may be performed in a number of ways.

For example a network node (e.g. a serving eNode B) may initiate an intra-band multi-component carrier transmission to a user equipment unit from multiple sites (e.g. from macro/pico nodes and/or from macro/RRH nodes). The network node may then observe the performance of the user equipment unit in response to the transmission. For example, in some embodiments, a network node may initiate a HARQ ACK/NACK request to the user equipment unit and determine the response of the user equipment unit to the request. The response of the user equipment unit to such a transmission may be referred to as performance metric #1.

The network node may have a priori information of the HARQ ACK/NACK performance of the user equipment unit when the intra-band aggregated component carriers (i.e. aggregated by the UE) are sent from the same node (e.g. a macro BS) in radio conditions similar to those used for observing performance metric #1. Such a response may be referred to as performance metric #0. If the difference between performance performance metrics #0 and #1 is within a threshold amount, then the network node may assume that user equipment unit is capable of performing intra-band carrier aggregation of component carriers received with large time differences, e.g. longer than a cyclic prefix.

The network node can store this detected user equipment unit capability information for this user equipment unit and use this information for scheduling intra-band carrier aggregation from different sites whenever needed. The network node may also signals this identified user equipment unit capability to other network nodes, such as other eNodeB nodes, and/or to the core network (e.g. for various purposes like HO, O&M, SON, network management etc).

In other embodiments, autonomous detection of user equipment unit capabiliies for performing intra-band carrier aggregation of component carriers received with large time differences can be based on the capability of the user equipment unit in performing inter-band carrier aggregation and/or the capability of the user equipment unit in performing intra-band carrier aggregation.

If a user equipment unit is capable of performing both inter-band carrier aggregation and intra-band carrier aggregation, the network may assume that the user equipment unit can also perform intra-band carrier aggregation of component carriers received at the user equipment unit with large time difference between them. The reason is that for handling inter-band carrier aggregation, the user equipment unit will typically have more than one FFT/IFFT/DFT processor, which performs baseband operations and is commonly used for intra-band and inter-band carrier aggregation. Hence, such a user equipment unit may also be capable of performing intra-band carrier aggregation of component carriers with large received time differences.

In further embodiments, if the network node is aware that the user equipment unit is capable of performing inter-band carrier aggregation of component carriers received with large time difference between them and that the user equipment unit also supports intra-band carrier aggregation, then the network may also assume that user equipment unit may be capable of performing intra-band carrier aggregation of component carriers, which are received with large time difference between them. The network node (i.e. the identifying node) may signal this identified user equipment unit capability information to other network nodes e.g. core network node like MME, eNode B, O&M, SON etc.

Figure 10:
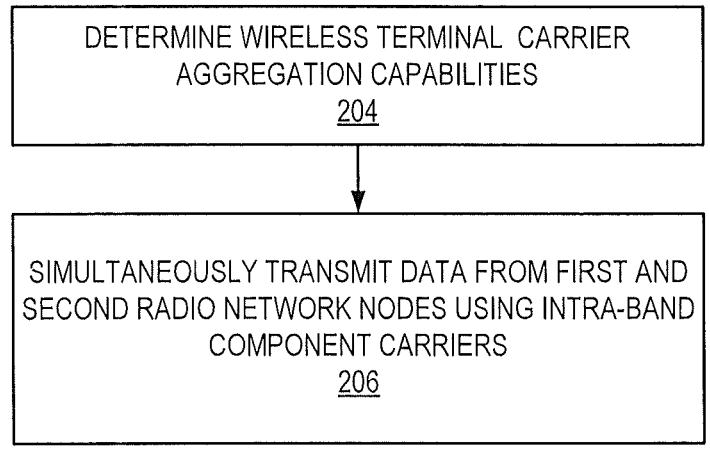
FIGS. 10-13 are flowcharts that illustrate operations of systems/methods according to some embodiments.

Operations of systems/methods according to some embodiments are illustrated in FIGS. 10-13. Referring to FIG. 10, in some embodiments a network and/or network node may determine the carrier aggregation capabilities of a user equipment unit (block 204). In particular, the network and/or network node may determine if the user equipment unit has the ability to perform inter-band carrier aggregation, intera-band carrier aggregation of component carriers sent from co-located nodes, and/or intra-band carrier aggregation of component carriers sent from non co-located nodes.

As noted above, the determination of the carrier aggregation capabilities of a user equipment unit may be based on explicit signalling by the user equipment unit and/or autonomously based on performance and/or features of the user equipment unit.

Figure 11:
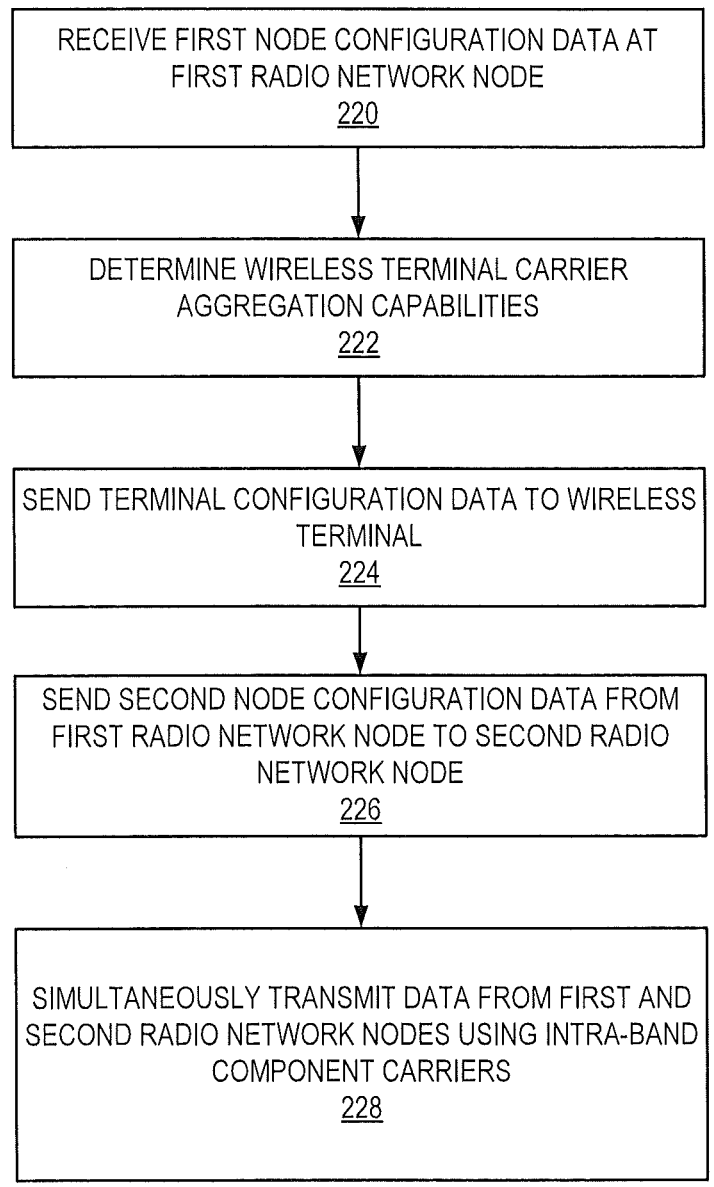

In response to determining that the user equipment unit is capable of performing intra-band carrier aggregation of component carriers sent from non co-located nodes, the methods further include simultaneously transmitting data from first and second non co-located radio network nodes using intra-band component carriers (block 206), Referring to FIG. 11, operations according to some embodiments include receiving first node configuration data at a first radio network node (block 220). The first node configuration data may indicate the identities of other radio network nodes on the same or different tier as the first radio network node. For example, if the first radio network node is a macro node, the first node configuration data may indicate the presence of one or more pico nodes or other macro nodes that has a service area that overlaps the service area of the first radio network node. The node configuration data may also inform the first radio network node of which component carriers are available to be used by the first radio network node.

The operations further include determining the capability of a user equipment unit served by the first radio network node to perform carrier aggregation (block 222). For example, the first radio network node may determine, through explicit messages from the user equipment unit and/or autonomously, whether the user equipment unit has the ability to perform inter-band carrier aggregation, intera-band carrier aggregation of component carriers sent from co-located nodes, and/or intra-band carrier aggregation of component carriers sent from non co-located nodes.

In response to determining the carrier aggregation capabilities of the user equipment unit, the first radio network node may send terminal configuration data to the user equipment unit (block 224). The terminal configuration data may indicate to the terminal which component carriers it should activate and/or whether the user equipment unit may be instructed to perform carrier aggregation of intra-band carriers having arrival times that may exceed the length of a cyclic prefix.

The first radio network node may also second node configuration data to a second radio network node (block 226). The second node configuration data may inform the second radio network node that it is to send data over a component carrier to the user equipment unit, and/or inform the second network node of which component carriers are available to be used by the second radio network node.

The first and second radio network nodes may then simultaneously transmit data to the user equipment unit using intra-band component carriers (block 228).

Figure 12:
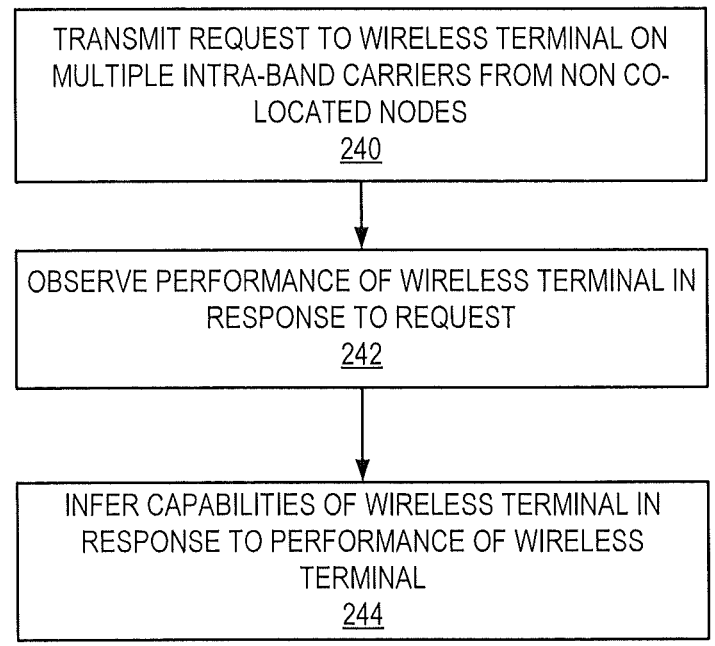

Operations for autonomously determining the carrier aggregation capabilities of a user equipment unit according to some embodiments are illustrated in FIG. 12. As shown therein, the operations may include transmitting a request to the user equipment unit on multiple intra-band carriers from non co-located radio network nodes (block 240). The performance of the user equipment unit in response to the request is observed (block 242), and the capability of the user equipment unit to perform intra-band carrier aggregation is inferred from the observed performance of the user equipment unit in responding to the request (block 244).

Figure 13:
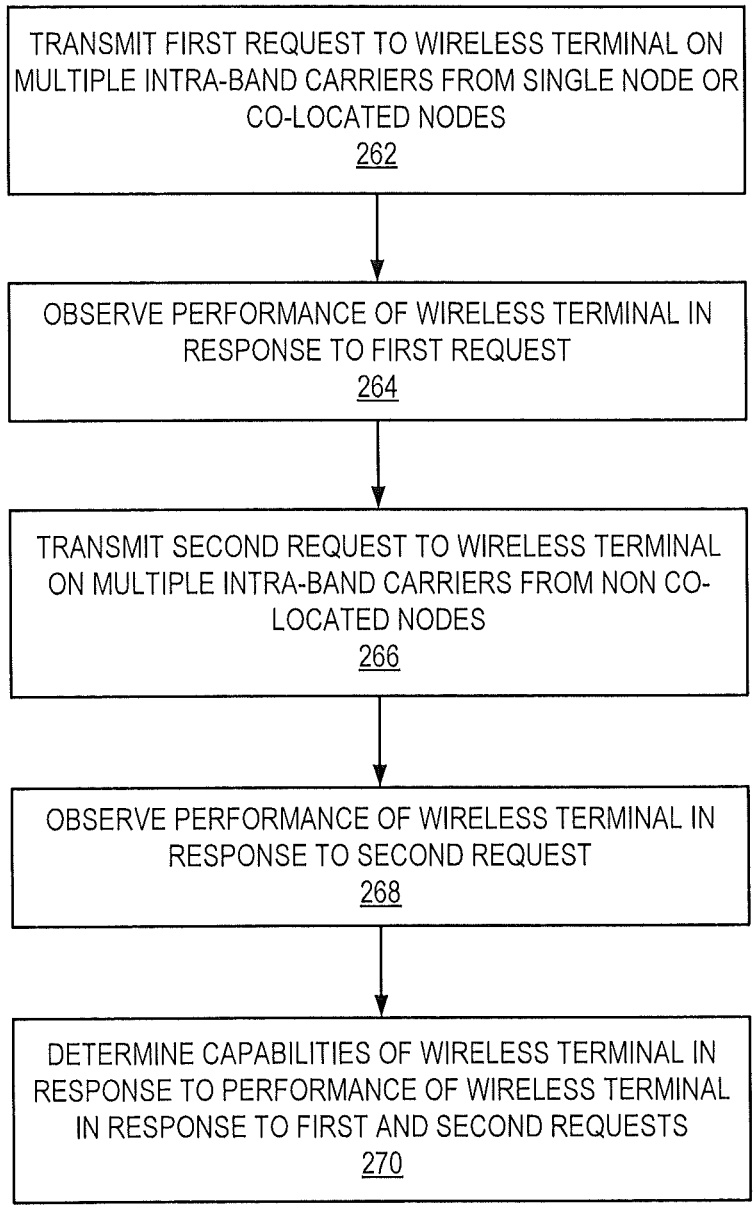

Operations for autonomously determining the carrier aggregation capabilities of a user equipment unit according to further embodiments are illustrated in FIG. 13. As shown therein, the operations include transmitting a first request to the user equipment unit on multiple intra-band carriers from a co-located radio network nodes and/or from a single node (block 262). The performance of the user equipment unit in response to the first request is observed (block 264).

A second request is transmitted to the user equipment unit on multiple intra-band carriers from non co-located radio network nodes (block 262), and the performance of the user equipment unit in response to the second request is observed (block 268).

The carrier aggregation capabilities of the user equipment unit may be determined by comparing the performance of the user equipment unit in response to the first and second requests. In particular, if a difference in response time between the first and second requests is less than a threshold level, the network may infer that the user equipment unit can process multiple intra-band carriers transmitted from non co-located radio network nodes.

Although described above primarily with reference to LTE network topologies, the inventive concept is also applicable to any network deployment scenario in which a user equipment unit aggregates component carriers transmitted from non co-located nodes.

Furthermore, the non co-located nodes may also have large differences in the carrier frequencies giving rise to large relative difference in the frequency errors between the component carriers. Generally the user equipment unit can handle the reception and carrier aggregation of component carriers, which have a small relative frequency error. According to another aspect of the invention the user equipment unit may also report its relative frequency error handling capability. For example the user equipment unit may indicate that it can aggregate carriers if the relative frequency error between the component carriers is within ±0.75 ppm. The network based on this user equipment unit capability and the inter-node relative frequency error may decide whether to perform intra-band carrier aggregation for this user equipment unit not. The network node may also signal the user equipment unit reported relative frequency error handling capability of handing intra-band carrier aggregation to other nodes e.g. eNode B, core network node like MME, RRH etc.

The invention allows the operator to build macro and pico networks with large macro to pico site to site distance in a network with UEs which has such a capability.

During the carrier aggregation work for LTE, various terms have been used to describe Component Carriers. The present invention is therefore applicable e.g. to situations where terms like multi-cell or dual-cell operation is described, e.g. with a Primary (Serving) Cell PCell and potentially multiple Secondary (Serving Cells) SCell, or alike. The person skilled in the art should easily understand this.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java® or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A method of performing intra-band carrier aggregation in a multi-tiered wireless network including a first radio network node that uses a first component carrier in a first frequency band and a second radio network node that is not co-located with the first radio network node and that uses a second component carrier in the first frequency band, the method comprising:

determining a capability of a user equipment unit located within an overlapping coverage area of the first and second radio network nodes to simultaneously receive data on the first component carrier from the first radio network node and on the second component carrier from the second radio network node when a time difference of arrival at the user equipment unit for transmissions from the first and second radio network nodes is greater than a smaller of a cyclic prefix duration of a first symbol transmitted by the first radio network node and a second cyclic prefix duration of a second symbol transmitted by the second radio network node; and transmitting first data to the user equipment unit from the first radio network node using the first component carrier simultaneous with the second radio network node transmitting second data to the user equipment unit using the second component carrier in response to determining that the user equipment unit is capable of simultaneously receiving data on the first component carrier from the first radio network node and on the second component carrier from the second radio network node.

2. The method of claim 1, further comprising receiving first configuration data at the first radio network node identifying the second radio network node and the second component carrier.

3. The method of claim 2, wherein the first configuration data is received from an eNodeB in a long term evolution network, a network management node or a configuring node.

4. The method of claim 1, wherein the second network node comprises a remote radio head, a base station or a relay.

5. The method of claim 1, wherein the first component carrier and the second component carrier have an aggregated bandwidth greater than 20 MHz.

6. The method of claim 5, wherein the first component carrier comprises a first 20 MHz component carrier in the first frequency band and the second component carrier comprises a second 20 MHz component carrier in the first frequency band.

7. The method of claim 1, wherein the first component carrier comprises a first 3GPP release-8 component carrier of 1.4, 3, 5, 10, 15 or 20 MHz channel bandwidth in the first frequency band and the second component carrier comprises a second 3GPP release-8 component carrier of 1.4, 3, 5, 10, 15 or 20 MHz channel bandwidth component carrier in the first frequency band.

8. The method of claim 1, wherein the first radio network node is configured to transmit data to the user equipment unit using an orthogonal frequency division multiplexing (OFDM) modulation scheme that employs an OFDM symbol with a first cyclic prefix having a first predefined cyclic prefix duration, the second radio network node is configured to transmit data to the user equipment unit using an OFDM symbol with a second cyclic prefix having a second predefined cyclic prefix duration.

9. The method of claim 1, wherein determining the capability of the user equipment unit to simultaneously receive data on the first component carrier from the first radio network node and on the second component carrier from the second radio network node comprises receiving second configuration data from the user equipment unit, the second configuration data identifying the capability of the user equipment unit to simultaneously receive data on intra-band carrier frequencies from both the first radio network node and the second radio network node.

10. The method of claim 9, wherein the second configuration data specifies a number of fast fourier transform processors included in the user equipment unit, wherein the number is greater than one.

11. The method of claim 9, wherein the second configuration data specifies a maximum time difference of reception between signals from the first and second component carriers that the user equipment unit is capable of handling.

12. The method of claim 1, wherein the determined capability of the wireless terminal is signaled to a third network radio node.

13. The method of claim 12, wherein the third network radio node is a target node for performing a handover.

14. The method of claim 1, wherein determining the capability of the user equipment unit to simultaneously receive data on the first component carrier from the first radio network node and on the second component carrier from the second radio network node comprises analyzing a reception performance of the user equipment unit.

15. The method of claim 14, wherein analyzing the reception performance of the user equipment unit comprises simultaneously transmitting data to the user equipment unit from the first radio network node using the first component carrier and transmitting data to the user equipment unit from the second radio network node using the second component carrier, and analyzing the reception performance of the user equipment unit in response to the simultaneous transmissions.

16. A method of performing intra-band carrier aggregation in a multi-tiered wireless network including a first radio network node that uses a first component carrier in a first frequency band and a second radio network node that is not co-located with the first radio network node and that uses a second component carrier in the first frequency band, the method comprising:
  determining a capability of a user equipment unit located within an overlapping coverage area of the first and second radio network nodes to simultaneously receive data on the first component carrier from the first radio network node and on the second component carrier from the second radio network node; and
  transmitting first data to the user equipment unit from the first radio network node using the first component carrier simultaneous with the second radio network node transmitting second data to the user equipment unit using the second component carrier in response to determining that the user equipment unit is capable of simultaneously receiving data on the first component carrier from the first radio network node and on the second component carrier from the second radio network node;
  wherein determining the capability of the user equipment unit to simultaneously receive data on the first component carrier from the first radio network node and on the second component carrier from the second radio network node comprises analyzing a reception performance of the user equipment unit;
  wherein analyzing the reception performance of the user equipment unit comprises simultaneously transmitting data to the user equipment unit from the first radio network node using the first component carrier and transmitting data to the user equipment unit from the second radio network node using the second component carrier, and analyzing the reception performance of the user equipment unit in response to the simultaneous transmissions; and
  wherein analyzing the reception performance of the user equipment unit comprises transmitting data to the user equipment unit from only the first radio network node using both the first component carrier and the second component carrier, and comparing the reception performance of the user equipment unit in response to the simultaneous transmissions from both the first and second radio network nodes to the reception performance of the user equipment unit in response to the transmission from only the first radio network node.

17. The method of claim 15, wherein analyzing the reception performance of the user equipment unit comprises analyzing the response of the user equipment unit to a hybrid automatic repeat request.

18. The method of claim 1, wherein determining the capability of the user equipment unit to simultaneously receive data on the first component carrier from the first radio network node and on the second component carrier from the second radio network node comprises determining that the user equipment unit is capable of performing both intra-band carrier aggregation and inter-band carrier aggregation.

19. A multi-tiered wireless network system, comprising:
  a first radio network node configured to transmit information using a first component carrier in a first frequency band in a first coverage area; and
  a second radio network node configured to transmit information using a second component carrier in the first frequency band in a second coverage area that overlaps geographically with the first coverage area in an overlapping coverage area;
  wherein the first radio network node is configured to receive first configuration data identifying the second radio network node and the second component carrier;
  wherein the first radio network node is further configured to determine a capability of a user equipment unit located within the overlapping coverage area to simultaneously receive data on the first component carrier from the first radio network node and on the second component carrier from the second radio network node; and
  wherein the first radio network node is configured to transmit first data to the user equipment unit from the first radio network node using the first component carrier in a first time frame; and
  wherein the second radio network node is configured to transmit second data to the user equipment unit using the second component carrier in the first time frame in response to the first radio network node determining that the user equipment unit is capable of simultaneously receiving data on the first component carrier from the first radio network node and on the second component carrier from the second radio network node when a time difference of arrival at the user equipment unit for transmissions from the first and second radio network nodes is greater than a smaller of a cyclic prefix duration of a first symbol transmitted by the first radio network node and a second cyclic prefix duration of a second symbol transmitted by the second radio network node.

20. The system of claim 19, wherein the first component carrier and the second component carrier have an aggregated bandwidth greater than 20 MHz.

21. The system of claim 20, wherein the first component carrier comprises a first 20 MHz component carrier in the first frequency band and the second component carrier comprises a second 20 MHz component carrier in the first frequency band.

22. The system of claim 20, wherein the first and second radio network nodes are configured to transmit data to the user equipment unit using orthogonal frequency division multiplexing (OFDM) modulation scheme that employs an OFDM symbol with a cyclic prefix having a predefined cyclic prefix duration.

23. The system of claim 19, wherein the first component carrier comprises a first 3GPP release-8 component carrier of 1.4, 3, 5, 10, 15 or 20 MHz channel bandwidth in the first frequency band and the second component carrier comprises a second 3GPP release-8 component carrier of 1.4, 3, 5, 10, 15 or 20 MHz channel bandwidth component carrier in the first frequency band.

24. The system of claim 19, wherein the first radio network node is configured to determine the capability of the user equipment unit to simultaneously receive data on the first component carrier from the first radio network node and on the second component carrier from the second radio network node in response to second configuration data received from the user equipment unit, the second configuration data identifying the capability of the user equipment unit to simultaneously receive data on intra-band carrier frequencies from both the first radio network node and the second radio network node.

25. The system of claim 24, wherein the second configuration data specifies a number of fast fourier transform processors included in the user equipment unit, wherein the number is greater than one.

26. The system of claim 24, wherein the second configuration data specifies a maximum time difference of reception signals from the first and second component carriers that the user equipment unit is capable of handling.

27. The system of claim 19, wherein the first radio network node is configured to determine the capability of the user equipment unit to simultaneously receive data on the first component carrier from the first radio network node and on the second component carrier from the second radio network node by analyzing a reception performance of the user equipment unit.

28. The system of claim 27, wherein the first radio network node is configured to analyze the reception performance of the user equipment unit by simultaneously transmitting data to the user equipment unit from the first radio network node using the first component carrier and transmitting data to the user equipment unit from the second radio network node using the second component carrier, and analyzing the reception performance of the user equipment unit in response to the simultaneous transmissions.

29. A multi-tiered wireless network system, comprising:
a first radio network node configured to transmit information using a first component carrier in a first frequency band in a first coverage area; and
a second radio network node configured to transmit information using a second component carrier in the first frequency band in a second coverage area that overlaps geographically with the first coverage area in an overlapping coverage area;
wherein the first radio network node is configured to receive first configuration data identifying the second radio network node and the second component carrier;
wherein the first radio network node is further configured to determine a capability of a user equipment unit located within the overlapping coverage area to simultaneously receive data on the first component carrier from the first radio network node and on the second component carrier from the second radio network node; and wherein the first radio network node is configured to transmit first data to the user equipment unit from the first radio network node using the first component carrier in a first time frame; and
wherein the second radio network node is configured to transmit second data to the user equipment unit using the second component carrier in the first time frame in response to the first radio network node determining that the user equipment unit is capable of simultaneously receiving data on the first component carrier from the first radio network node and on the second component carrier from the second radio network node
wherein the first radio network node is configured to determine the capability of the user equipment unit to simultaneously receive data on the first component carrier from the first radio network node and on the second component carrier from the second radio network node by analyzing a reception performance of the user equipment unit;
wherein the first radio network node is configured to analyze the reception performance of the user equipment unit by simultaneously transmitting data to the user equipment unit from the first radio network node using the first component carrier and transmitting data to the user equipment unit from the second radio network node using the second component carrier, and analyzing the reception performance of the user equipment unit in response to the simultaneous transmissions; and
wherein the first radio network node is configured to analyze the reception performance of the user equipment unit by transmitting data to the user equipment unit from only the first radio network node using both the first component carrier and the second component carrier, and comparing the reception performance of the user equipment unit in response to the simultaneous transmissions from both the first and second radio network nodes to the reception performance of the user equipment unit in response to the transmission from only the first radio network node.

30. The system of claim 28, wherein the first radio network node is configured to analyze the reception performance of the user equipment unit by analyzing the response of the user equipment unit to a hybrid automatic repeat request.

31. The system of claim 19, wherein the first radio network node is configured to determine the capability of the user equipment unit to simultaneously receive data on the first component carrier from the first radio network node and on the second component carrier from the second radio network node by determining that the user equipment unit is capable of performing both intra-band carrier aggregation and inter-band carrier aggregation.

* * * * *